Oct. 14, 1969
H. ALLEN
3,472,271
LIFT-TURN PLUG VALVE
Filed June 3, 1966
2 Sheets-Sheet 1
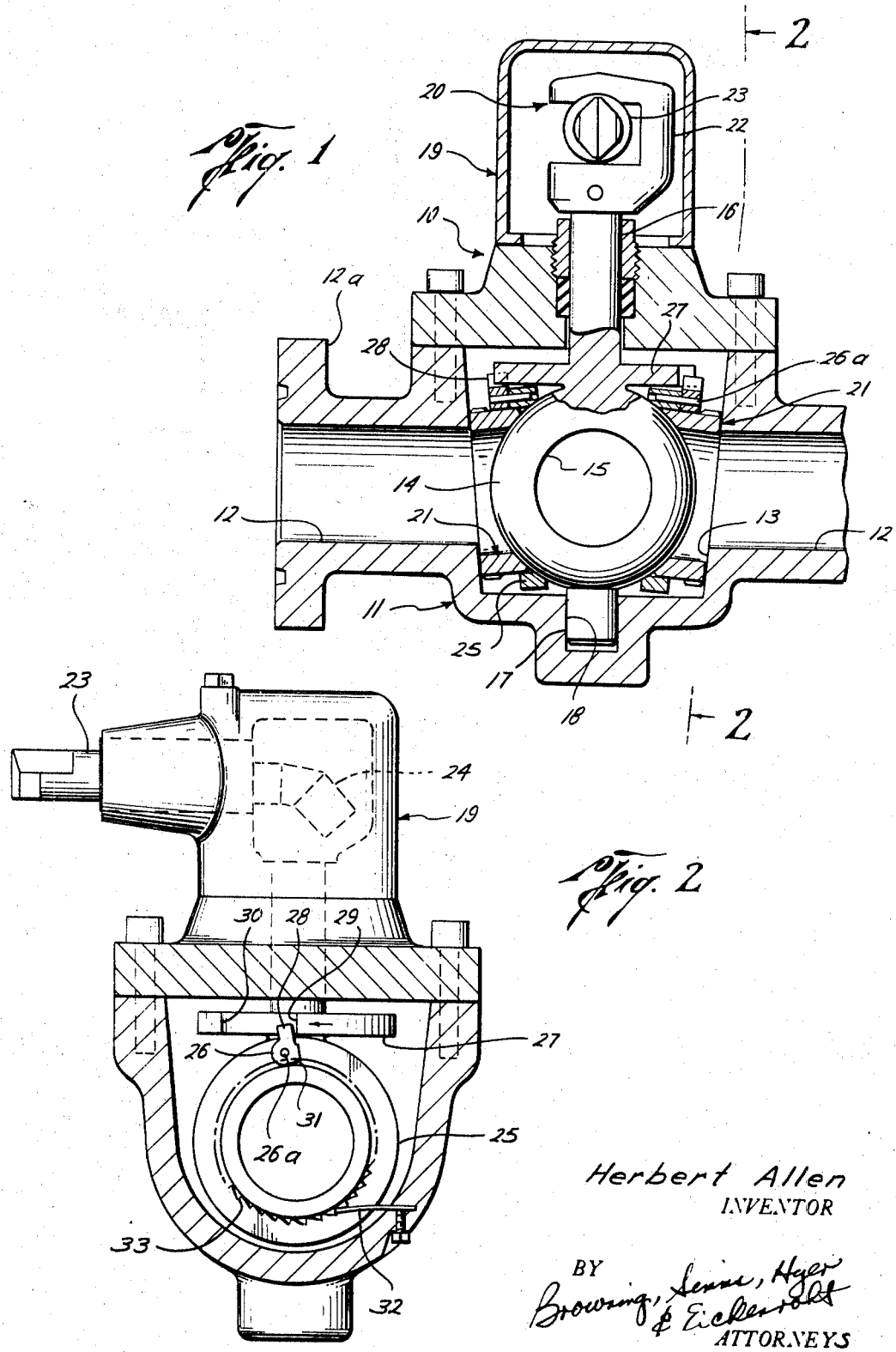
Herbert Allen
INVENTOR
BY Browning, Simms, Hyer
& Eickenroht
ATTORNEYS

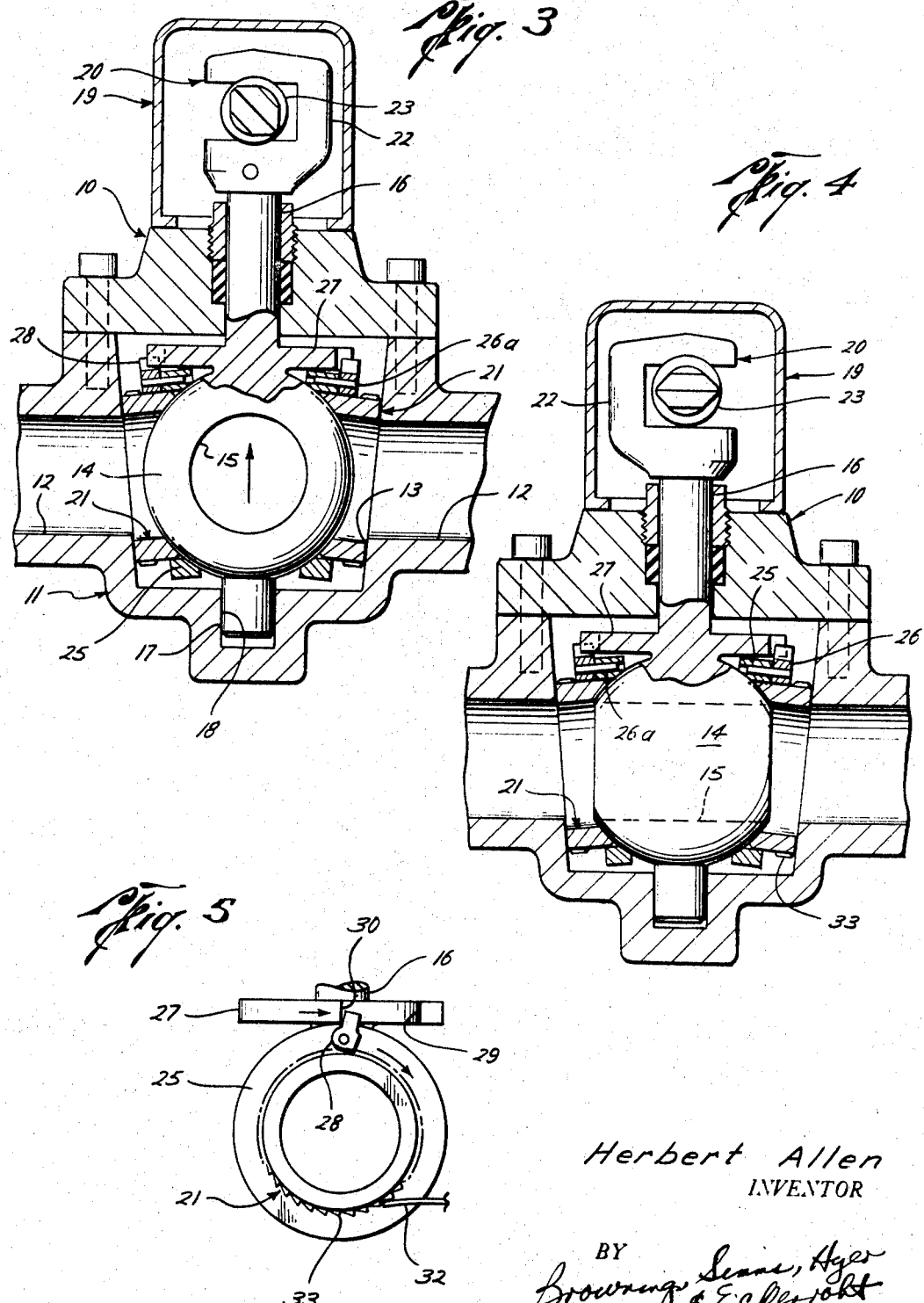

United States Patent Office 3,472,271
Patented Oct. 14, 1969

3,472,271
LIFT-TURN PLUG VALVE
Herbert Allen, Houston, Tex., assignor to Cameron Iron Works, Inc., Houston, Tex., a corporation of Texas
Filed June 3, 1966, Ser. No. 555,041
Int. Cl. F16k 5/06, 5/20, 29/00
U.S. Cl. 137—329.05                                    2 Claims

ABSTRACT OF THE DISCLOSURE

A lift-turn plug valve wherein a chamber intersecting the flowway through the valve body has downwardly and inwardly tapering, planar sides, and a ball shaped valve member having a port through it is mounted within the chamber for rotation between flowway opening and closing positions. There is an operator for lifting, rotating and lowering the valve member between its opened and closed positions, and each of a pair of annular seats has an inner end tightly engaged with one side of the valve member and an outer end tightly engaged with the adjacent side of the valve body in the opened and closed positions of the valve member, whereby they are lifted and lowered with the valve member while being held against rotation with it. Each seat is of uniform thickness intermediate its inner and outer ends so that it may be rotated about its axis, and a means is provided for so rotating the seat in response to and during only that portion of the cycle of operation of the operator in which the seat is above its position of tight engagement between the valve member and the adjacent side of the chamber.

---

This invention relates to improvements in lift-turn plug valves.

In prior valves of this type, a frusto-conically shaped plug is wedged between seats within a valve body chamber so as to effect a tight seal therebetween in the opened and closed positions of the plug. In order that the plug may be rotated easily between these positions, the operator is of such construction as to lift it from the seats and then lower it back into wedging engagement between the seats. Preferably, the plug is initially lifted before being rotated, and is fully lowered only after being fully rotated. Thus, from a theoretical standpoint, the plug is separated from the seat before there is any sliding between their sealing surfaces. However, as a practical matter, a portion of the downstream side of the plug will flex so as to slide across the adjacent seat surface as it is raised or as it is lowered. As a result, the sealing surfaces between the plug and seat may be scored and thus more susceptible to leakage.

In this as well as other types of valves, there is a tendency for the seat to wear along the portion of its inner peripheral edge which is first to be opened and last to be closed during operation of the valve member. In my prior Pat. No. 2,977,975, I proposed to distribute such wear about the seat of certain types of valves by causing the seat to be rotated about its axis between different rotational positions upon each cycle of operation of the valve. However, due to the frusto-conical shape of the plug of the usual lift-turn type plug valve, such seats are inherently non-rotatable.

It is an object of this invention to provide a lift-turn plug valve in which this tendency to score the sealing surfaces will be minimized; and, more particularly, in which there is only light sliding engagement between the plug and seats during operation of the valve between opened and closed positions.

A further object of the invention is to provide such a valve in which wear is distributed about the seats; and, more particularly, in which the seats are caused to rotate between different rotational positions during operation of the valve.

A still further object is to provide a lift-turn plug valve for accomplishing one or both of the foregoing objects which is relatively simple and of inexpensive construction.

These and other objects are accomplished, in accordance with the illustrated embodiment of the invention, by a lift-turn plug valve in which the plug is ball-shaped and separate seats are tightly engaged between it and the tapering sides of the valve chamber in the opened and closed positions of the plug. More particularly, the inner end of each seat engages the ball in such a way that it is lifted and lowered with the ball, and the sides of the valve chamber are planar so that each seat is held against rotation with the ball as the ball is moved between opened and closed positions. Since relative sliding between the seats and the ball occurs only when the seats are raised and thus relatively lightly engaged with the ball, the tendency to score the sealing surfaces between the ball and seats is minimized.

In accordance with a further novel aspect of the invention, at least one of the seats is of uniform thickness intermediate its inner and outer ends engageable between the ball and sides of the valve body chamber, respectively, so as to be rotatable about its axis between different rotatable positions, and suitable means is provided for so rotating it. More particularly, this means is responsive to that portion of the cycle of operation of the valve in which the seat is raised from tight engagement between the ball and adjacent side of the valve body chamber. Thus, sliding of the seat relative to the ball occurs only when the seat is relatively lightly engaged therewith.

In the drawings where there is shown, by way of illustration, one embodiment of the invention:

FIG. 1 is a longitudinal sectional view of a lift-turn plug valve constructed in accordance with the present invention, and with the ball-shaped valve member thereof in closed position;

FIG. 2 is a cross-sectional view of the valve, as seen along broken line 2—2 of FIG. 1;

FIG. 3 is a view similar to FIG. 1, but with the operator turned to a position for raising the stem, ball-shaped valve member and seats a slight amount;

FIG. 4 is another view similar to FIGS. 1 and 3, but with the ball-shaped valve member turned to its open position and lowered with the seats so as to fit tightly between the sides of valve body chamber; and FIG. 5 is a view of one of the seats and a portion of the valve member shown in FIG. 2, but upon turning of the valve member to the open position shown in FIG. 4.

With reference now to the details of the above-described drawings, this valve, which is indicated in its entirety by reference character 10, includes a valve body 11 having a flowway 12 therethrough and means such as a flange 12A at each end for connecting the valve in a conduit. An enlarged chamber 13 in the valve body intersects the flowway 12 intermediate its opposite ends so as to receive a ball-shaped valve member 14 therein for movement between opened and closed positions.

As shown in the drawings, the valve member 14 has a port 15 therethrough of a diameter substantially the same as the diameter through flowway 12, and has stems 16 and 17 on its upper and lower ends, respectively. The lower stem 17 is journaled within a bearing 18 in the lower side of the valve body, while the upper stem is journaled within a bearing in the lower end of a bonnet 19 which is removably secured to the valve body to close the upper end of the chamber 13.

The upper end of stem 16 is in turn connected with a lift-turn operator 20 which, as will be described to follow, is operable, during opening or closing of the valve, to first lift the ball along the axis of its stems, rotate it 90°, and then lower it along the axis of its stems. Thus, in opening, the ball is lifted from its FIG. 1 position to its FIG. 3 position, rotated 90° to move it from closed to opened position, and then lowered into its FIG. 4 position.

A seat 21 is carried within the valve chamber on each side of the ball 14 for tight engagement between the ball and adjacent upwardly and outwardly tapering planar sides of the chamber 13 in the lowered positions of the ball shown in FIGS. 1 and 4. Thus, the inner end of each seat is shaped to fit the spherical surface of the ball, while the outer end thereof is shaped to fit closely against the tapered side wall of the chamber 13. More particularly, the inner ends of the seats 21 engage the ball in such a way that lifting of the ball 14 will, in turn, lift the seats 21 therewith and the lowering of the ball will lower the seats therewith.

Thus, as the ball is lifted and lowered, the tight engagement of the seats between the ball and the side walls of the chamber is relieved, so as to minimize the likelihood of scoring the sealing surfaces therebetween as the ball is rotated.

As previously described, the seats 21 are held against rotation with the ball by virtue of the planar surfaces of the outer ends of the seats and sides of the valve chamber.

For several reasons, including those to be described, the operator 20 is of the type previously mentioned which first lifts the valve member from seated position without turning it, rotates it between its opened and closed positions, either with or without concurrent lifting and lowering, and then lowers it back to seated position without turning. In the illustrated embodiment of this valve, the operator 20 is of the type shown in Allen Pat. No. 2,715,838. Although reference may be had to such patent for details of this operator, it is shown in the drawings to include a head 22 connected to the upper end of the stem 16, a shaft 23 carried for rotation in the bonnet 19, and a crank arm 24 (see FIG. 2) on the shaft cooperable with the head for lifting, turning, and lowering it in the desired manner.

As indicated by the end of the shaft 23 shown in FIGS. 1, 3 and 4, and as more fully described in Allen Pat. No. 2,715,838, during the first 45° of rotation of the shaft 23 in a counterclockwise direction from the position of FIG. 1 to the position of FIG. 3, the crank arm 24 cooperates with the head 22 so as to lift the ball without turning it. Rotation of the shaft a further 225°, and thus a total of 270° from the position of FIG. 1, will effect rotation and concurrent lifting and turning of the ball and then a subsequent lowering of the ball without rotation into its original position. Obviously, a reversal of this procedure will return the ball from opened to closed position so as to complete a cycle of its operation.

In accordance with a further novel aspect of the present invention, and as previously described, each seat 21 is of uniform thickness intermediate its inner end engaging with the ball and its outer end engaging the tapered side wall of the chamber in the lowered position of the ball. As previously mentioned, this enables the seats to be rotated about their axes between different rotational positions. As can be seen from the drawings, although the openings through the seats are substantially the same diameter as the flowway 12 and port 15 through the ball, in this particular embodiment of the invention, the seats are necessarily tilted at a small angle with respect to the vertical so that their axes of rotation extend at a similar angle with respect to the axis of port 15 and flowway 12.

The previously mentioned means for automatically rotating the seats between these rotational positions includes a ring 25 about each seat, a dog 26 pivotally mounted by a pin 26a on the inner upper side of the ring, and a disc 27 on and rotatable with the valve member stem 16 for moving the dog 26 and thus the seat 21 with respect to the ring 25 in response to each cycle of operation of the valve. As will be apparent from the description to follow, this particular seat rotating means is quite similar to that shown and described in prior Pat. No. 2,977,975. Thus, reference may be made to this patent for a more detailed description of the construction and operation of such means.

As shown in each of FIGS. 2 and 4, the lower edge of the dog is disposed adjacent the outer periphery of each seat, and there is an upwardly extending neck 28 on the dog disposed in the path of rotation of the disc 27. More particularly, the disc is recessed at each side to provide oppositely facing shoulders 29 and 30 thereon alternately engageable with the neck 28 on the dog 26 as the valve member moves between opened and closed positions. As shown in FIG. 2, as the disc 27 is moved with the ball 14 into its open position, shoulder 29 engages against the neck 28 and thus swings the dog in a counterclockwise direction about the pin 26a. This urges the downwardly pointing end 31 of the dog away from the outer periphery of the seat, thereby normally permitting the carrier ring 25 to move with respect to the seat 21. On the other hand, upon rotations of the ball from its opened to its closed position, the oppositely facing shoulder 30 on the disc 27 is engaged against the opposite side of the neck 28 of dog 26 so as to urge its lower end 31 tightly against the outer periphery of the seat, as shown in FIG. 5. Thus, as indicated by the arrow, this causes the seat to rotate a short distance with the carrier 25 during the final opening movement of the ball 14.

Thus, each of the seats 21 is caused to rotate from one rotational position to another during each cycle of operation of the valve—i.e., during a complete opening and closing of the valve. More particularly, this rotation of each seat is caused to occur during the final opening movement of the ball—i.e., while the ball is still raised above seated position. This relief of the tight engagement of the seat between the ball and side walls of the chamber not only minimizes the possibility of scoring the sealing surfaces between the seat and the ball, but also facilitates its rotation.

In any case, however, it should be understood that the particular means for rotating the seat is unimportant to the broader aspects of this invention, so that the seat may be rotated by other means obvious to a person skilled in the art.

In this particular embodiment of the invention, the seat rotating means also includes a strip 32 of spring steel or the like, carried within the valve chamber 13 so as to dispose its free end in position for engaging teeth 33 about the outer periphery of the seats adjacent their outer ends. As shown in FIGS. 2 and 5, the steep sides of these teeth face the end of strip 32 so as to prevent rotation of the seat 21 in a counterclockwise direction, while permitting it upon rotation of the seat in a clockwise direction. Consequently, the strip and teeth cooperate with the above-described means to permit rotation of the seat only in response to the final opening movement of the ball.

Reviewing now the overall operation of this valve, it will be assumed that the ball is in the closed position of FIG. 1. When it is desired to move the ball to the opened position, the shaft 23 is turned in a counterclockwise direction. During the first 45° of shaft rotation, the stem 16 and thus the ball 14 are raised without rotation as indicated by comparison of FIGS. 1 and 3. During this time, the seats 21 are raised with the ball 14 so as to relieve the tight engagement of the seats between the ball and side walls of chamber 13.

As the shaft 23 of the operator 20 continues to be rotated in a counterclockwise direction, the ball 14 is gradually rotated while being lifted a further amount from the position shown in FIG. 3. Upon continued rotation of the shaft through an arc of 180°, the ball is gradually lowered until it assumes the elevation shown in FIG. 3. At this stage, the port 15 in the ball has been rotated 90° to the opened position indicated in FIG. 4. During the final portion of this rotation of the ball 14, the shoulder 29 on the disc 27 will have engaged with the dog 26 so as to swing its lower end into tight engagement with the seat 21, as indicated in FIG. 5. This will cause the seat to rotate about its rotational axis a short distance. As previously described, however, this seat rotation occurs while the seats are still raised with the ball above tight engagement between the ball and side wall of the chamber. Continued turning of the shaft through the final arc of 45° will move the ball and thus the seats downwardly without rotation into their fully seated positions shown in FIG. 4.

Movement of the ball from the opened position of FIG. 4 back to the closed position of FIG. 1 merely involves a reversal of the above-described procedure. That is, the shaft 23 is instead rotated in a clockwise direction through an arc of 270° so as to lift, rotate, and lower the ball. During this return movement of the ball, shoulder 29 on disc 27 will engage dog 26 toward the end of the closing movement of the ball. However, this swings the lower end of the dog out of tight engagement with the seat, as shown in FIG. 2, so that there is no tendency for the seat to rotate with the ring 25. Furthermore, any such tendency is countered by the cooperation of strip 32 with teeth 33 about the seat.

From the foregoing, it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

The invention having been described, what is claimed is:

1. A lift-turn plug valve, comprising a valve body having a flowway therethrough and a chamber therein intersecting the flowway intermediate its opposite ends, the chamber having downwardly and inwardly tapering, planar sides, a ball-shaped valve member having a port therethrough and mounted within the chamber for rotation between an open position in which its port is aligned with the flowway and a closed position in which its port is out of alignment with the flowway, an operator for lifting, rotating, and lowering said valve member between open and closed positions, and annular seats each having an inner end tightly engaged with one side of the valve member and an outer end tightly engaged with the adjacent side of the chamber in the valve body in the open and closed positions of the valve member so as to be lifted and lowered with said valve member while being held against rotation therewith.

2. A lift-turn plug valve of the character defined in claim 1, wherein one seat is of uniform thickness intermediate said inner end engaging the valve member and its outer end engaging the chamber side so as to be rotatable about its axis between different rotational positions, and including means for so rotating the seat between different rotational positions in response to and during only that portion of the cycle of operation of said operator in which said seat is above its position of tight engagement between said valve member and adjacent side of the chamber.

References Cited

UNITED STATES PATENTS

| | | | |
|---|---|---|---|
| 1,941,839 | 1/1934 | Johansson | 251—170 |
| 2,977,975 | 4/1961 | Allen | 137—330 |

WILLIAM F. O'DEA, Primary Examiner

DAVID R. MATTHEWS, Assistant Examiner

U.S. Cl. X.R.

137—454.6; 251—159, 170, 360